United States Patent [19]
Klein

[11] 3,880,771
[45] Apr. 29, 1975

[54] AQUEOUS SUSPENSION VEHICLE USEFUL IN SUSPENSION POLYMERIZATION SYSTEM FOR SPHERES

[75] Inventor: Max Klein, New Shrewsbury, N.J.

[73] Assignee: Normac, Inc., Matawan, N.J.

[22] Filed: Jan. 17, 1972

[21] Appl. No.: 218,596

Related U.S. Application Data

[63] Continuation-in-part of Ser. No. 700,704, Jan. 26, 1968, abandoned.

[52] U.S. Cl. ............... 252/357; 252/311; 252/351; 252/356; 260/93.5 W
[51] Int. Cl. ....................... B01f 17/22; B01f 17/48
[58] Field of Search .... 252/356, 351, 357, DIG. 15; 260/93.5 W; 106/186

[56] References Cited
UNITED STATES PATENTS

| | | | |
|---|---|---|---|
| 2,508,341 | 5/1950 | Wilson | 260/93.5 W X |
| 3,186,975 | 6/1965 | Harris | 260/93.5 W |
| 3,280,089 | 10/1966 | Wright | 260/93.5 W |
| 3,328,374 | 6/1967 | Ronden et al. | 260/93.5 W |

*Primary Examiner*—Richard D. Lovering

[57] ABSTRACT

There is disclosed an aqueous suspension vehicle consisting essentially of water having dissolved therein a water-soluble suspending agent, such as one or more hydroxyethylcelluloses, in a concentration below about 0.4 weight percent, and about 0.01 to about 0.5 percent of a water-soluble organic solvent for said suspending agent, such as dimethylformamide.

5 Claims, No Drawings

AQUEOUS SUSPENSION VEHICLE USEFUL IN SUSPENSION POLYMERIZATION SYSTEM FOR SPHERES

This application is a continuation in part of copending application Ser. No. 700,704 filed Jan. 26, 1968 and now abandoned.

This invention is that of an aqueous suspending agent solution or vehicle useful for suspension polymerization of a styrenemonomer such as styrene as well as derivatives of it and also mixtures with it, as defined further below, to produce styrenepolymers (also as defined below). The invention includes also a suspension polymerization batch, as well as an improvement in the method, for the suspension polymerization of a styrene-monomer.

As these various parts of the invention initially are applicable to the emulsion polymerization of styrene, although not to be limited to it, the invention conveniently can be explained with earlier particular reference to its application to suspension polymerization of styrene, for example, for the production of styrene-polymer spheres as a direct product of the suspension polymerization, and especially in larger sizes than heretofore so obtainable. More particularly, the improved aqueous suspending vehicle for the suspension polymerization of a styrene-monomer and the polymerization conducted by using that vehicle provides the finished styrene-polymer in spheres of a size considerably well beyond 1 and 2 millimeters and up to even as much as 15 millimeters, and even higher, in diameter.

By "styrene-monomer" is meant not only styrene itself but also the other vinyl monomers that similarly polymerize by addition, i.e. a polymerizable substituted styrene such as a nuclear (lower)alkylated styrene, e.g. a ring-methyl-substituted styrene such as the vinyltoluenes and the mixed vinyltoluenes, a nuclear-halogenated styrene such as a ring chlorine-substituted styrene as para-chlorostyrene, a dichlorostyrene and mixed dichloro-styrenes, or ortho-chlorostyrene, or even an alpha-(lower)alkyl-styrene as alpha-methyl styrene, isopropylstyrene, tertiary-butyl-styrene, vinylxylene, and mixtures of any of them and also mixtures of styrene (to provide copolymers of it) with generally a minor portion of one or more compatible polymerizable beta-unsaturated esters such as methyl methacrylate, ethers, amides, or nitriles of acrylic acid and their alpha-position-alkylated homologs, vinyl esters of aliphatic and aromatic carboxylic acids, N-vinyl cyclic azoies as N-vinylcarbazole and N-vinylimidazole, or N-vinylpyrrolidone.

Thus, by a "styrene-polymer" is meant any of the resulting polymers obtained by the herein described emulsification polymerization of any of these styrene-monomers. The styrene-polymers include also the copolymers resulting from the copolymerization of any of the foregoing mentioned mixtures of styrene with one or more of these other compatible polymerizable substances.

Such copolymers of styrene ordinarily optimally contain at least about 50 percent of styrene by weight, or it may be the predominant component or at least equal in predominance to the other higher present part of any terpolymer.

Polystyrene for use by extrusion to provide polystyrene crystal pellets has been made by aqueous suspension polymerization which provides commercially polystyrene spheres of only about a few hundred microns in diameter. To obtain polystyrene beads useful, for example, in custom jewelry and related applications, there were prepared in the desired sizes for the beads polystyrene spheres either by molding from molding powder or by extruding polystyrene cyrstals into rods of desired diameters and grinding out from them the desired size spheres.

Those procedures not only are costly but have certain undesirable features such as showing mold marks on the molded spheres and grinding marks as well as considerable digression from sphericity on those prepared by grinding from rods. Their costs are increased by efforts to remove mold marks by a subsequent tumbling operation. However, generally neither of these types has entirely satisfactory finished surfaces. Each of them can be colored only by expensive inclusion of pigment with the molding powder or crystal pellets or by applying coatings which also are costly and subject to the possibility of flaking. Attempts to dye them result in crazed color, matte and generally dull appearance.

Use of the aqueous suspending agent solution or vehicle of the invention, and its improvement in the method of suspension polymerization eliminates the molding and grinding cost by providing as a direct product of the polymerization spheres having not only a range of highly variedly useful sizes but also smooth, clean lustrous surfaces which readily can be dyed to give a highly attractive, durable, non-flaking colored appearance.

Heretofore there has been used as the suspending agent in the aqueous suspension vehicle for suspension polymerization various water-soluble, organic polymeric suspending agents such as carboxymethyl-cellulose, polyacrylic acid, polymethacrylic acid, and the sodium or ammonium salts of any of them, as well as hydroxyethyl cellulose of high vixcosity (such as 'Cellosize 4400 ' H grade, of Union Carbide Corporation, New York, N.Y.), a 2 percent (by weight, dry basis) aqueous solution of which at 20°C. has a Hoopler viscosity of 6175 to 7600 centipoises and corresponding Brookfield viscosity at about 25°C. of 4700 to 5200 with spindle No. 4 at 60 rpm, dissolved in water, for example, to at least about 1 percent by weight.

They are used in the suspension polymerization of styrene together with ordinary rotating shaft agitation as with a propeller or paddle type agitator, but with the earlier mentioned limited result in the range of but a few hundred microns in diameter of resulting polystyrene spheres. That necessitated molding, or rod extrusion and grinding, to produce larger size spheres of diameter over 1.5 or 2 millimeters and up to 12 millimeters or more.

By use of the aqueous suspension vehicle of this invention, the amount of water-soluble organic polymeric suspending agent inert to reaction with styrene heretofore required to be used can be reduced markedly, for example, even by at least 50 percent or more by replacing part, say, up to about one-third or one-half of it by a water-soluble organic solvent for the suspending agent, such as formic acid, or a non-ionizable such solvent as tetrahydrofuran or dimethyl sulfoxide, or an amino group-bearing such solvent as a dimethyl amide as dimethylformamide and dimethyl acetamide, or an alkylene polyamine as ethylenediamine and diethylenetriamine, or 3-cyanopyridine or 2-bromopyridine.

This, to illustrate, it was found that not only was the amount needed of, for example, hydroxyethyl cellulose suspending agent reduced by at least about two-thirds, but also the possibility of agglomeration of the polymer spheres was greatly reduced by including in the aqueous suspension vehicle a sufficient amount of any of these water-soluble organic solvents for it, e.g., dimethylformamide to the extent of, say, from about 5 to about 50 percent of the total hydroxyethyl cellulose suspending agent content. There also was found an indication of the possibility that the extent of formation of the desired larger sized spheres is enhanced, as well as of obtaining a high percentage of a desired range of size of spheres.

As another part of the invention, it was found that by replacing a significant part of that earlier above described high viscosity hydroxyethyl cellulose by, say, from about 10 to about 50 percent by weight of a lower viscosity hydroxyethyl cellulose (e.g. 'Cellosize WPO9' H grade of Union Carbide Corporation) whose 5 percent (by weight, dry basis) aqueous solution shows a Hoopler viscosity of 120 to 160 centipoises at 20°C. and corresponding Brookfield viscosity of 100 to 140 centipoises at about 25°C. with spindle No. 1 at 30 rpm, as the suspending agent in the aqueous vehicle, the resulting suspension polymerization of styrene results in reducing the chance of agglomeration of the spheres than is possible when using the higher viscosity hydroxyethyl cellulose alone.

It also was found as part of the invention that by agitating the charge of admixed improved aqueous suspension vehicle and the styrene monomer with its polymerization catalyst and the small percentage (less than 0.5 percent by weight of the styrene) of mineral oil, by end over end rotation in a polymerization vessel that can be fluid-tightly closed and is mounted for rotation on a shaft whose axis is perpendicular to the longitudinal axis of the polymerization vehicle, the production of desired larger sized polystyrene spheres is enhanced further.

It is advantageous first to add the suspending agent, for example, the hydroxyethyl cellulose beneficially in about equal parts by weight of the above described higher and lower viscosity products, to the extent by weight of a total (of both) of about 1 percent in the water to be used in the suspension, advantageously together with the water-soluble organic solvent to be used for the suspending agent, such as dimethyl formamide to the extent of about 0.5 percent by weight of what is to be a preliminary charge for preparing the suspension agent solution, and to agitate that charge until the hydroxyethyl cellulose goes into solution, say, for about 1 hour at about 170°F. Thereby is prepared a stock aqueous suspending agent solution.

An initial weight of water, say, about 4 times that to be used of the styrene monomer can be changed into the polymerization vessel or reactor. To it is added an amount of the stock aqueous suspension agent solution about half the weight of that water. Then the polystyrene with the catalyst and small amount (less than 0.5 percent) of the lubricant mineral oil dissolved in it can be added to the reactor and to about the extent to fill it. More water then can be added to fill any air space.

After the reactor is fluid-tightly closed, the suspension polymerization can be conducted at a sufficient temperature for a sufficient time for the planned degree of polymerization to be reached, while the reactor is rotated end over end at a low rate of rotation about an axis perpendicular to the axis of the reactor.

Such a reactor can be a steel cylinder about 3 times as long as its diameter and equipped with an outwardly extending flange at each end, each to be fluid-tightly closed with a bolted on cap and an intermediate water, styrene and lubricating oil resistant gasket such as of the tetrafluoroethylene fluorohydrocarbon polymer (available under the trademark 'Teflon' from E.I. duPont de Nemours).

The reactor can be fitted with a shaft extending diametrically oppositely outwardly from its cylinder wall along an axis diametrically perpendicular to the middle of the cylinder axis. The cylinder can be mounted for rotation end over end on suitable shaft supports while submerged in a water tank maintained at a temperature to provide the desired polymerization temperature, and connected with suitable means for rotating the shaft in driving connection with a source of rotation power.

The stock aqueous suspending agent solution conveniently can contain by weight about 98.5 parts of water, about 10 parts of the selected suspending agent such as the hydroxyethylcellulose suspending agent and beneficially with half of it being the earlier above described higher viscosity product and the other half being the lower viscosity product, and advantageously about 5 parts of the selected water-soluble organic, better nonionizable, solvent for the suspending agent, such as dimethylformamide. such stock aqueous suspending solution is illustrated by, but not limited to, the following:

EXAMPLE 10- STOCK AQUEOUS SUSPENDING AGENT SOLUTION 24 pounds of the higher viscosity hydroxyethylcellulose ('Cellosize 4400' H), and the lower viscosity hydroxyethylcellulose ('Cellosize WPO9' H), and also of dimethylformamide were added to 570 gallons of tap water and heated and stirred to solution, in a suitable vessel at 170°F. for 1 hour. The resulting aqueous solution was allowed to cool and held as a stock aqueous suspending agent solution for use in separate portions as needed.

The water-soluble polymeric organic suspending agent inert to reaction with the styrene-monomer is included, in the aqueous suspension vehicle useful in suspension polymerization of the styrene-monomer, in a concentration above that which will allow the styrene-polymer to agglomerate under the polymerization conditions and below 0.4 weight percent and to the extent which provides a pH of as low as about 5 in said vehicle.

The water-soluble organic solvent for the said organic suspending agent is present in the aqueous suspension vehicle in the range of from about 0.01 to about 0.5 percent by weight.

The suspension polymerization advantageously was carried out in a cylindrical reactor (such as described earlier above) designed for end over end rotation about an axis perpendicular to the longitudinal axis of the reactor, for example, with an inside diameter of about 17 inches and about 54 inches long.

A polymerization effective sufficient amount of the free radical-providing catalyst, suitable to the selected polymerization conditions, in a total amount by weight of, say, from about 0.37 to about 0.45 percent of the monomer is added to and dissolved in the styrene together with a lubrication effective amount by weight (such as from about 0.4 to about 0.5 percent) of lubrication mineral oil The reaction batch is prepared, for example, by diluting in the reactor an amount by weight of the stock aqueous suspending agent solution double that of the amount of styrene to be used, with tap water in an amount of about twice that of the aqueous suspending agent solution. To that diluted suspending agent is added the sytrene monomer containing the catalyst and the mineral oil. Beneficially any space above the liquid mixture is filled with additional water and the reactor is fluid-tightly closed as described earier above.

As the styrene-polymerization free-radical type catalysts can be used, for example, one or more of alpha,alpha'-azobisisobutyronitrile, benzoyl peroxide, cumene hydroperoxide, or mono- or di-tertiary butyl hydroperoxide can be used. Especially effective is the azobisisobutyronitrile, the effectiveness of which is enhanced by including benzoyl peroxide to the extent by weight of about 10 percent of the total catalyst.

A processing batch useful for the suspension polymerization of styrene (as the styrene-monomer) is composed of an aqueous phase which is the aqueous suspension vehicle of the invention and an organic phase composed of the styrene monomer and a polymerization-effective amount of free radical-providing catalyst; and in such batch the water-soluble organic suspending agent is present in the range of from about 0.2 to about one pound of it to about 50 pounds of styrene, and the styrene is present in the range of from about one pound of it to from about 6 to about 7 pounds of water.

The suspension polymerization is illustrated by, but not restricted to, the following example:

EXAMPLE 2 - SUSPENSION POLYMERIZATION PRODUCING POLYSTYRENE COMPRISING LARGE DIAMETER SPHERES 100 pounds of the stock aqueous suspending agent solution of Example 1 was admixed with 200 pounds of tap water in the earlier above described reactor. To the thus diluted aqueous suspending agent solution was added 50 pounds of styrene monomer containing dissolved in it 80 grams of alpha,alpha'-azobisisobutyronitrile, 10 grams of benzoyl peroxide, and 100 grams of polystyrene lubricant brand mineral oil.

Sufficient additional water was added to raise the liquid level in the upright open reactor to about its top. The reactor was fluid-tightly sealed and immersed in a bath that provided a polymerization temperature of 157°F. while the reactor was rotated at 3 rpm for a time sufficient for the reaction to be completed. That usually is at least about 12 to 15 hours, but conveniently was run overnight to a total of approximately 18. It can be run overnight for even about 20 hours because no harm results from any extra time.

After the run was completed, one end cap of the reactor was unbolted. The reactor was rotated a little over a quarter revolution and its contents emptied into a screen which retained the polystyrene spheres and on which they are washed with tap water after the aqueous suspension vehicle drained off. The resulting polystyrene spheres ran in diameter from one thirty-second up to about one-quarter inch, which after drying were screened into various desired size ranges. Any quite small percentage of out of round approximately tear drop shaped product, if desired, can by removed by suitable screening means.

Quite advantageous in extending the range of operating conditions that produce increased percentages of desired larger size spheres is to include in the reactor with the fresh charge about a handful of agitation-enhancing pieces such as stainless steel balls or nuts or pipe caps. Doing so enables reducing the quantity of the stock aqueous suspending agent solution below the minimum of it effective to give satisfactory yield of the desired spheres without the use of such added inert steel pieces.

For example, instead of using the stock aqueous suspending solution in amount twice the weight of the styrene monomer, the quantity of stock aqueous suspension solution can be reduced to various amounts lower than twice that of the styrene down to even about 80 percent of its weight, that is, to about 40 pounds of the stock suspension solution to 50 pounds of styrene and yet give a satisfactory yield of desired large size polystyrene spheres within the range of diameter including over one millimeter and greater than two millimeters and even up to 12 and also to about 18 millimeters, without using any inert agitation-enhancing pieces such as the stainless steel balls or the like as described above.

However, with the inclusion of such agitation-enhancing pieces, the weight quantity of the stock suspension agent solution was reduced still further even to as little as 40 percent of the weight of the styrene monomer and yet gave a satisfactory yield of the large size spheres within the just above described range of diameters, and at the same time increasing the production per batch.

The relative quantities of any of the various other ingredients used in either of the foregoing examples can be modified. For example, various changes can be made in the relative proportions of the two different viscosity hydroxyethylcellulose suspending agents used in Example 1 and within the range disclosed for them. So also, either of these hydroxyethylcelluloses can be replaced in whole or in part by the other of them or by an equivalently effective amount of any other of the herein described and specifically identified suspending agents which include also polyvinyl alcohol.

So also the dimethylformamide can be replaced at least in part, for example, up to at least about 50 percent by weight, and in some combinations, for example, with dimethylacetamide, tetrahydrofuran, or dimethylsulfoxide, as a whole, by some other one of the herein described and specifically identified other of the water-soluble solvents for the suspending agent.

Also, various changes can be made in Example 2 as to the various constituents of its polymerization batch, as in the individual aqueous suspension solution and its styrene-monomer, e.g. styrene, phase ingredients, and-/or its operating conditions.

Thus, for example, the total of the catalyst can be varied from about 85 to at least about 100 grams per 50 pounds of styrene or other styrene-monomer wherein the azobisisobutyronitrile can vary from about 80 to about 75 grams and the benzoyl peroxide from about 10 to about 80 grams. Use of the latter to the extent of over 100 grams may so accelerate the polymerization as to result in agglomeration of the polymer mass.

The polymerization temperature can be reduced to as low as about 155°F. and up to about 163°F. and yet give a satisfactory yield of the desired range of diameter spheres. To illustrate, the charge as used in Example 2 heated at 153° or at 164°F. can produce a viscous mess, but that is avoided by operating within the range from about 155° to 163°F.

So also, the styrene in Example 2, or in any of the various modifications of it (as described after that example) can be replaced at least in part, for example, by one or more of the compatible polymerizable olefinic substances described above (page 2 lines 4–10) for admixture with styrene (or any of its above disclosed derivatives) to provide copolymers, such as an aliphatic beta-unsaturated ester as methyl methacrylate, or in part or as a whole, for example, with a nuclear-halogenated styrene such as a nuclear-chlorostyrene or -dichlorostyrene, or an alpha(lower)alkyl-styrene as alpha-methylstyrene, or by any other of the earlier above described vinyl monomers that also polymerize by addition.

In order to avoid unduly extending the specification, Example 1 is to be considered as if it is modified by the various above described possible changes to provide additional respectively so modified examples as if appearing herein as written out in full with the respective earlier above described various changes that can be made in it. So also, Example 2 is to be considered as likewise so modified by making any of the above described possible variations in it and thus to provide the resulting respective additional different examples as if appearing herein as written out in full as they would appear as separate complete examples embracing these various different modifications.

The free falling agitation-enhancing pieces, for example, the caps, can be approximately octagonal in cross-section in a plane perpendicular to the axis and about 2 inches in outside diameter with one-quarter inch walls, and about 2 inches high. Such caps were used in a repeat run of that described in Example 2.

While the invention has been explained by detailed description of certain specific embodiments of it, it is understood that various substitutions and modifications can be made in them within the scope of the appended claims which are intended also to cover equivalents of these embodiments.

What is claimed is:

1. An aqueous suspension vehicle useful in suspension polymerization of a styrene-monomer in the presence of a styrene-monomer-polymerization effective amount of a styrene-monomer-polymerization free radical-providing catalyst, which suspension consists essentially of (a) water and dissolved therein (b) a water-soluble suspending agent inert to reaction with styrene, which is at least one of (i) a hydroxyethylcellulose having a viscosity within the range of one whose 2 percent by weight, on dry basis, aqueous solution at 20°C. has a Hoopler viscosity of from 6175 to 7600 centipoises, (ii) a hydroxyethylcellulose whose such 5 percent aqueous solution at 20°C. has a Hoopler viscosity of from 120 to 160 centipoises, (iii) carboxymethylcellulose, (iv) polyacrylic acid, (v) polymethacrylic acid, (vi) the sodium or ammonium salt of any of the carboxylic acid substances (iii), (iv), and (v), and (vii) polyvinyl alcohol; said suspending agent being present in a concentration above that which will allow the produced styrene-polymer to agglomerate under the polymerization conditions and below about 0.4 weight percent, and (c) from about 0.01 to about 0.5 percent of a water-soluble organic solvent for said suspending agent, which solvent is selected from the group consisting of formic acid, dimethylformamide, dimethyl-acetamide, tetrahydrofuran, ethylenediamine, diethylenetriamine, 2-bromopyridine, and 3-cyanopyridine.

2. An aqueous suspension vehicle as claimed in claim 1, wherein the styrene-monomer is styrene, and said suspending agent is at least one of said hydroxyethylcelluloses.

3. An aqueous suspension vehicle as claimed in claim 1, wherein the suspending agent is a mixture of approximately equal parts of each of said hydroxyethylcelluloses having the respective viscosities of those at the beginning and end of the range expressed in claim 1.

4. An aqueous suspension vehicle as claimed in claim 2, wherein said organic solvent is dimethylformamide.

5. An aqueous suspension vehicle as claimed in claim 4, wherein the dimethylformamide is replaced in part or entirely by one or both of dimethylacetamide or tetrahydrofuran.

* * * * *